July 22, 1969    H. G. BRILMYER    3,456,526
SAFETY STEERING WHEEL ASSEMBLY
Filed Aug. 18, 1967
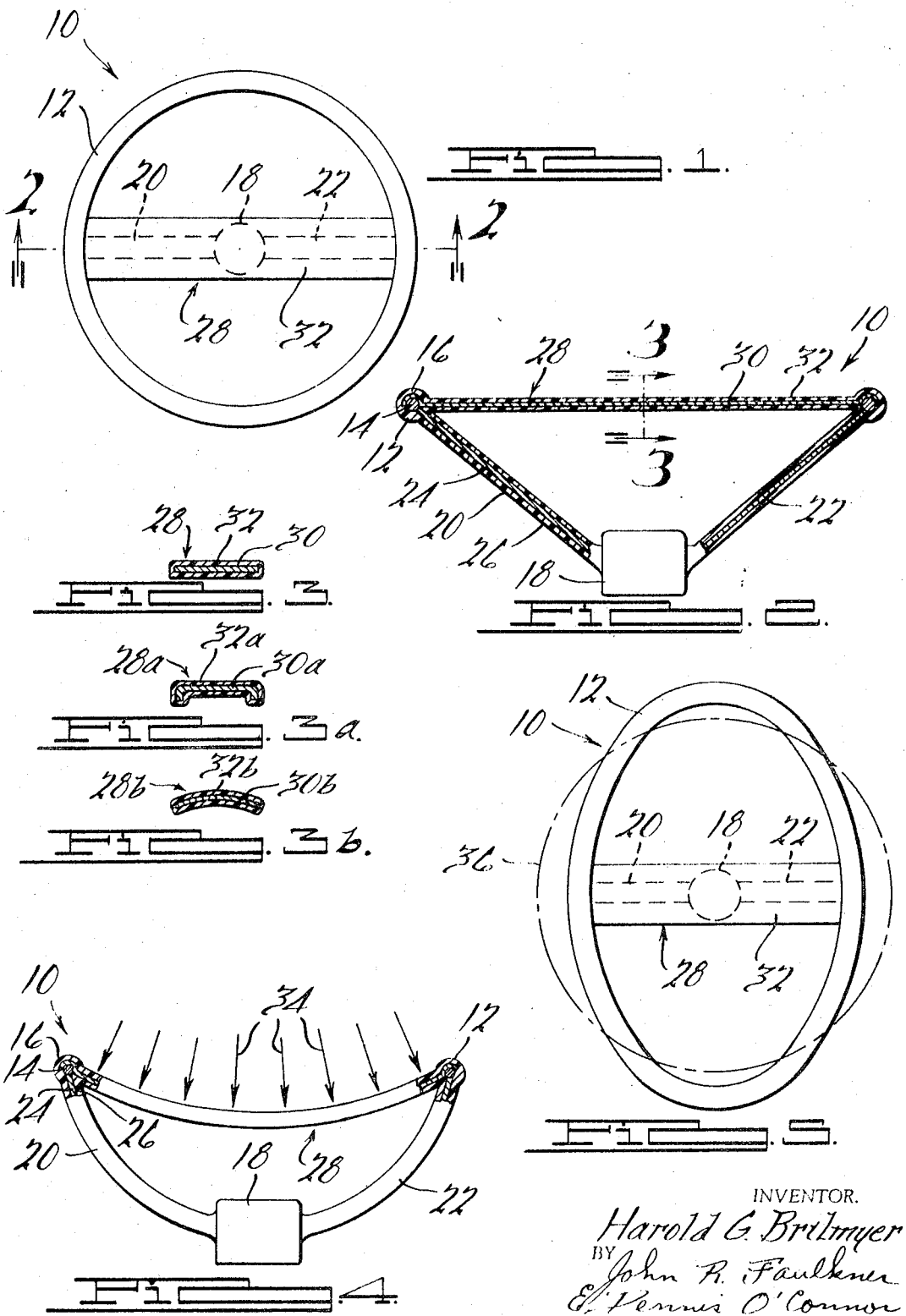
INVENTOR.
Harold G. Brilmyer
BY John R. Faulkner
E. Dennis O'Connor
ATTORNEYS

United States Patent Office 3,456,526
Patented July 22, 1969

3,456,526
SAFETY STEERING WHEEL ASSEMBLY
Harold G. Brilmyer, Grosse Pointe, Mich., assignor to Ford Motor Company, Dearborn, Mich., a corporation of Delaware
Filed Aug. 18, 1967, Ser. No. 661,569
Int. Cl. G05g 1/10
U.S. Cl. 74—552    6 Claims

ABSTRACT OF THE DISCLOSURE

A motor vehicle safety steering wheel assembly including a steering wheel formed from deformable material and connected by a pair of deformable spokes to a recessed steering column hub. The points of attachment of the spokes to the wheel are diametrically opposed and interconnected by a flexible steel strap lying in the plane of the wheel. Upon being impacted by a force of sufficient magnitude, the strap transmits impact forces to the spokes and wheel causing a deformation of these members and a corresponding dissipation of impact energy.

BACKGROUND OF THE INVENTION

Current motor vehicle design parameters dictate that a steering wheel assembly must be capable of dissipating a predetermined amount of impact energy when the steering wheel is impacted, as by the body of a motor vehicle operator during rapid deceleration or crash conditions. Well known in the art are steering wheel assemblies wherein the steering wheel is formed from deformable material and connected by spokes, also formed from deformable material, to a recessed steering column hub. Such arrangements are known as "deep dish" steering wheels and are designed to prevent the vehicle operator from impacting a relatively non-deformable, non-resilient steering column hub while permitting the dissipation of impact energy due to the deformation of the steering wheel and spokes.

It is an object of this invention to provide a motor vehicle safety steering wheel assembly including a deep dish steering wheel formed, together with connecting spokes, from deformable material, and to maximize the energy absorbing capabilities of this assembly during deformation. An additional deformable element in the steering wheel assembly is provided and is capable of combining with the steering wheel and spokes to absorb an even greater magnitude of impact energy.

SUMMARY OF THE INVENTION

A motor vehicle safety steering wheel assembly constructed in accordance with this invention includes a steering wheel formed from deformable material into an essentially circular shape and lying in a plane. A supporting steering column hub is spaced from the plane of the steering wheel and connected to the wheel by a pair of spokes also formed from deformable material. One end of each of the spokes is connected to the hub while the other end of each of the spokes is connected to a point on the steering wheel. The points of attachment between the spokes and the wheel are diametrically opposed on the wheel. A flexible steel strap, lying in the plane of the wheel, is secured to the wheel at each of the above mentioned points of attachment and cooperates with said spokes to form a structural triangle with the hub of the steering column located at one apex of the triangle. When impacted by a body located on the side of the steering wheel plane remote from the steering column hub and moving towards the steering column hub, this steering wheel assembly dissipates impact energy due to deformation of the steel strap, the deformable steering wheel and the deformable connecting spoke.

DESCRIPTION OF THE DRAWINGS

FIGURE 1 is a front elevation view of the motor vehicle safety steering wheel assembly of this invention;

FIGURE 2 is a partial sectional view taken along the line 2—2 of FIGURE 1;

FIGURE 3 is a sectional view taken along the line 3—3 of FIGURE 2;

FIGURE 3a is a view similar to FIGURE 2 but showing a modification of the connecting strap illustrated in FIGURE 3;

FIGURE 3b is a view similar to FIGURE 3 but showing still another modification of the connecting strap illustrated in FIGURE 3;

FIGURE 4 is a view similar to FIGURE 2 but showing the orientation of the steering wheel assembly of this invention as it responds to an impact load; and FIGURE 5 is a view similar to FIGURE 1 but showing the orientation of the steering wheel assembly under the conditions illustrated in FIGURE 4.

DETAILED DESCRIPTION OF THE INVENTION

Referring now in detail to the drawings and in particular to FIGURES 1 and 2, the numeral 10 denotes generally the motor vehicle safety steering wheel assembly of this invention and includes an essentially circular steering wheel 12. The construction of steering wheel 12 is conventional in that it includes a central steel core ring 14 surrounded by a sheath or coating 16 of synthetic material such as plastic. Strength characteristics of composite steering wheel 12 are such that it will be deformed when impact loads, such as occur during rapid vehicle deceleration and/or crash conditions, are applied thereto.

The steering wheel assembly 10 is of the deep dish type in that a steering column hub 18 is spaced from the plane of steering wheel 12. A pair of spokes 20 and 22, having equal length, interconnect hub 18 and steering wheel 12. Spokes 20 and 22 are constructed in a similar manner to steering wheel 12 so that deformation under impact loading may occur. In particular, these spokes include a central steel core member 24 surrounded by a sheath 26 of synthetic material. As illustrated in FIGURE 1, the points of attachment between each of the spokes 20 and 22 and steering wheel 12 are diametrically opposed on the steering wheel circumference.

These points of attachment between spokes 20 and 22 and steering wheel 12 also serve as points of attachment for the ends of a flexible strap 28 and steering wheel 12. Strap 28 lies in the plane of steering wheel 12 and includes a flexible metal strap member 30 covered by a flexible coating of synthetic material 32. The flexible coating 32 of composite strap 28 provides protection for the vehicle operator against contact with edges of the flexible metal strap 32.

In particular vehicle applications of this invention, however, it may be desirable to modify the shape of strap 28 to provide even greater protection to the vehicle operator. Such modifications are illustrated by FIGURES 3a and 3b. In FIGURE 3a it may be observed that flexible metal strap element 30a is formed in a shape of an inverted U, with the base portion of the U proximate the vehicle operator. Metal strap 30a is covered by a flexible synthetic coating 32a. This configuration of the connecting strap as well as that shown in FIGURE 3b, wherein the cross section of the metal strap 30b and its covering 32b have an arcuate shape, offer still greater protection against contact between the vehicle operator and any abrasive or sharp edges that may be present on the metal strap.

A plurality of arrows 34 in FIGURE 4 illustrate impack loading of flexible strap 28 during conditions that may be present during rapid vehicle deceleration or a vehicle crash. As may be observed from FIGURE 2, strap 28 cooperates with the spokes 20 and 22 to form a structural triangle having steering column hub 18 at one apex of the triangle. When the impact forces illustrated by arrows 34 cause a deformation of strap 28 from the orientation illustrated in FIGURE 2 to the orientation shown in FIGURE 4, the presence of the structural triangle described above dictates deformation of spokes 20 and 22 into the positions shown in FIGURE 4. Such a deformation is, of course, accompanied by a deformation of steering wheel 12 into the elliptical shape illustrated in FIGURE 5. For purposes of comparison, the original configuration of steering wheel 12 is represented in ghost at 36 in FIGURE 5.

The deformation of spokes 20 and 22 as well as the deformation of steering wheel 12 caused by the application by the dissipation of a large amount of impact energy. Furthermore, the application of impact energy to strap 28 will cause an elongation and accompanying "necking down" of strap 28, adding to the amount of impact energy absorbed. Also, strap 28 provides a positive stop against movement of the vehicle operator against steering column hub 18.

It may thus be seen that this invention provides a motor vehicle safety steering wheel assembly that precludes impact between the motor vehicle operator and the steering column hub. This invention also provides for the dissipation of large amounts of impact energy during motor vehicle deceleration or crash conditions due to the deformation of a plurality of deformable elements included in said assembly.

I claim:

1. In a motor vehicle, a steering wheel assembly comprising a steering wheel formed from deformable material and lying in a plane, a steering column hub spaced from said plane, a pair of spokes, one end of each of said spokes connected to said hub, the other end of each of said spokes connected to a point on said wheel, the points of attachment between said spokes and said wheel being diametrically opposed on said wheel, a structural element lying in said plane and secured to said wheel at each of said points of attachment, said element and said spokes forming a structural triangle lying in a plane perpendicular to the plane of said steering wheel, said hub being at one apex of said triangle.

2. The steering wheel assembly according to claim 1, wherein said spokes are formed from rigid deformable material.

3. The steering wheel assembly of claim 2, wherein said element comprises a flexible strap.

4. In a motor vehicle, an energy absorbing structure positioned in the vehicle passenger compartment and including an essentially circular ring of deformable material lying in a plane, a supporting member spaced from said plane, a pair of elongate structural elements, each of said members having equal length and interconnecting said ring and said supporting member, the points of attachment between said elements and said ring being located on a common diameter of said ring, and an elongate flexible strap, each end of said strap being secured to said ring at one of said points of attachment.

5. The structure of claim 4, wherein said elements are formed from rigid deformable material, whereby a force of predetermined magnitude applied to said strap from the side of said plane remote from said supporting member causes deformation of said ring into an essentially elliptical shape.

6. The structure of claim 4, wherein said ring is a vehicle steering wheel and said supporting member is a vehicle steering column hub.

References Cited

UNITED STATES PATENTS

| 3,055,231 | 9/1962 | Daniel | 74—552 |
| 2,269,492 | 1/1942 | Sorensen | 74—552 XR |
| 3,321,996 | 5/1967 | Cardinale | 74—552 |

FOREIGN PATENTS

| 664,996 | 6/1963 | Canada. |
| 780,564 | 2/1935 | France. |

FRED C. MATTERN, Jr., Primary Examiner

M. ANTONAKAS, Assistant Examiner